US010310359B2

(12) United States Patent
Desmond

(10) Patent No.: US 10,310,359 B2
(45) Date of Patent: Jun. 4, 2019

(54) RETRACTABLE LIGHTING BOX FOR PHOTOGRAPHY

(71) Applicant: Michael Desmond, Culver City, CA (US)

(72) Inventor: Michael Desmond, Culver City, CA (US)

(*) Notice: Subject to any disclaimer, the term of this patent is extended or adjusted under 35 U.S.C. 154(b) by 0 days.

(21) Appl. No.: 15/959,166

(22) Filed: Apr. 20, 2018

(65) Prior Publication Data

US 2018/0329278 A1 Nov. 15, 2018

Related U.S. Application Data

(60) Provisional application No. 62/487,861, filed on Apr. 20, 2017.

(51) Int. Cl.
*G03B 15/02* (2006.01)
(52) U.S. Cl.
CPC ................... *G03B 15/02* (2013.01)

(58) Field of Classification Search
USPC ........................................................ 396/1, 2
See application file for complete search history.

(56) References Cited

U.S. PATENT DOCUMENTS

| 5,915,132 A * | 6/1999 | Counts, Jr. ............. G03B 15/10 396/1 |
| 6,411,778 B1 * | 6/2002 | Peterson ................ G03B 15/00 396/1 |
| 2007/0039247 A1 * | 2/2007 | Greenfeld ................. E04H 6/04 52/2.25 |
| 2007/0094947 A1 * | 5/2007 | Greenfeld ................. E04H 6/04 52/79.1 |

* cited by examiner

*Primary Examiner* — Clayton E. LaBalle
*Assistant Examiner* — Warren K Fenwick

(57) ABSTRACT

A lighting box for photography comprising paneling held in place via a frame that can by quickly assembled and broken down from a small, lightweight carrying case. The lighting box is configured to generate studio-type lighting in a portable configuration via use of natural sunlight.

19 Claims, 5 Drawing Sheets

RETRACTABLE LIGHTING BOX FOR PHOTOGRAPHY

CROSS-REFERENCE TO RELATED APPLICATIONS

This application claims priority from U.S. provisional application Ser. No. 62/487,861, filed on Apr. 20, 2017, herein incorporated by reference in its entirety.

BACKGROUND

Field of the Description

The present description relates generally to photography equipment. More particularly, the description is directed to a lighting box for photography.

Description of the Background Art

For many photography projects, it is desirable to have a predictable lighting environment, e.g. a portable studio that may be used in the home, outdoors, or poorly lit building. However, existing light boxes for photography are generally difficult to work with, cumbersome and/or expensive.

Accordingly, an object of the present technology is a portable lighting studio that is lightweight, modular, and easy to set up and break down.

SUMMARY OF THE DISCLOSURE

An aspect of the present description is a lighting box for photography comprising paneling held in place via a frame that can by quickly assembled and broken down from a small, lightweight carrying case. The lighting box is configured to generate studio-type lighting in a portable configuration via use of natural sunlight.

Further aspects of the description will be brought out in the following portions of the specification, wherein the detailed description is for the purpose of fully disclosing preferred embodiments of the description without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

The present description, detailed in FIGS. 1 to 6 below, is directed to a photography lighting box 10 that is modular, collapsible, and portable.

Figure 1:
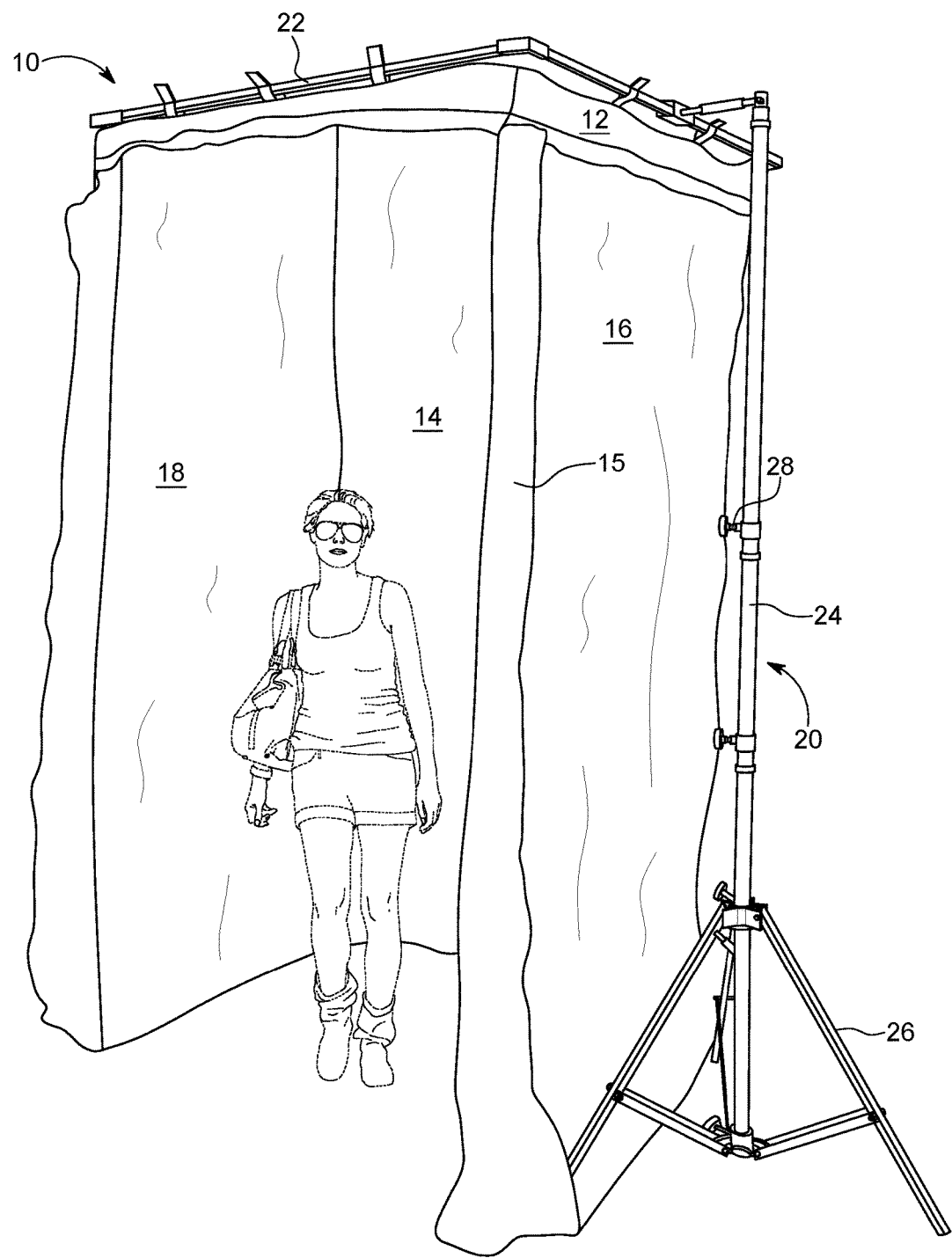
FIG. 1 is an image showing a subject within a lighting box assembled in accordance with the present description.

Referring to the image of FIG. 1, lighting box 10 is shown assembled for an outdoor photography shoot in accordance with the present description. Lighting box 10 generally comprises a frame 20 for holding upper fabric skirt or canopy 12 and panels (front panel 15, side panels 16, 18, and rear panel 14). The width and height of the panels 14-18 are generally sized to accommodate one or more individuals/shooting subjects with sufficient clearance between the canopy 12, panels 14-18 and the shooting subject. In the configuration shown in FIG. 1, the front panel 15 is shown rolled back. However, as will be discussed in further detail below, any one of the panels may be partially or fully detached from the canopy 12 according to the photographer's desired lighting effect.

Frame 20 comprises a plurality of releasably collapsible tubular members supported by retractable stands 26. A pair of laterally-positioned telescoping beams 24 are supported at their bottom end by retractable stands 26, and are configured to releasably couple at their top ends to hold and suspend rectangular top frame member 22 in an elevated orientation above the ground.

Figure 2:
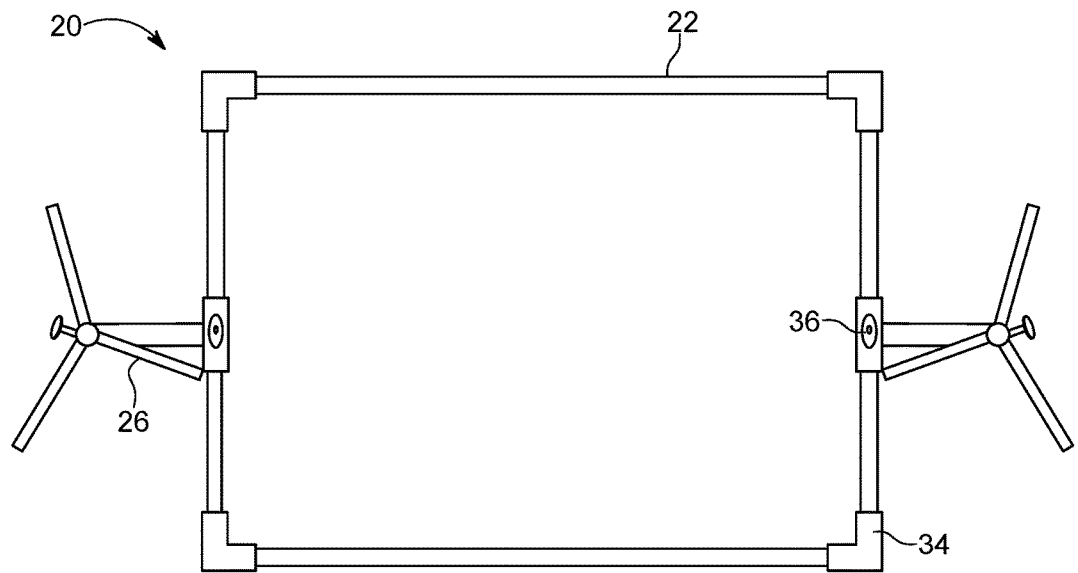
FIG. 2 is a plan view of the frame used in the lighting box of the present description.
Figure 3:
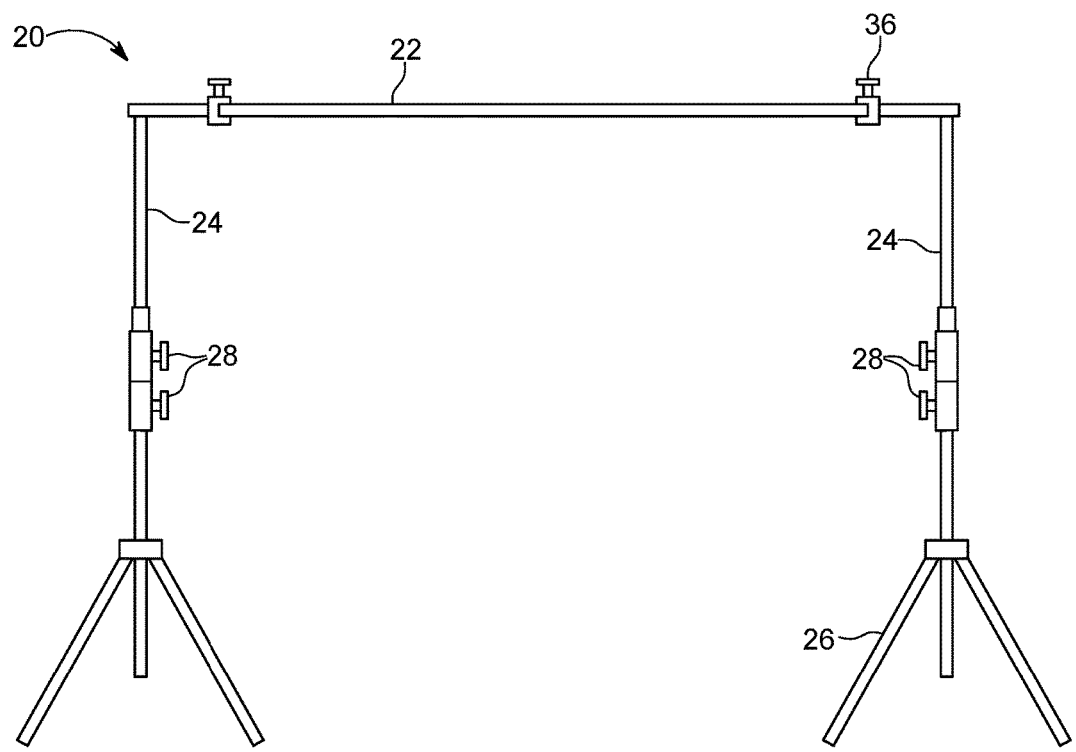
FIG. 3 is a side view of the frame shown in FIG. 2.

FIG. 2 and FIG. 3 show a plan view and a side view, respectively, of the frame 20 without the canopy 12 or panels 14-18 attached. Top frame member 22 comprises four tubular members (e.g. 1 in. square rectangular tubing) held together via corner connectors 34. In one embodiment, the tubular members are approximately 4 ft. in length to form a 5 ft×5 ft square box. Releasable tightening of the corner connectors 34 to the tubular members may be achieved via set screws or other quick-release type mechanisms. The telescoping side beams 24 are coupled to the top frame member 22 via a pair of clamps 36 that are offset from the side beams a set distance (e.g. 6 in. to make clearance for the legs of stands 26). Once the top frame member 22 is elevated to the proper height, telescope clamps 28 may be tightened (e.g. with levers or the like fastening means) to hold telescoping beams 24 in their vertical orientation.

It is appreciated that frame 20 may comprise other releasable configurations (not shown) configured to suspend the canopy 12. For example, the frame may comprise four side beams (one at each corner), and couplings (e.g. clamps 36, corner connectors 34, and side clamps 28) may comprise any number of releasable coupling available in the art. In one alternative configuration (not shown), canopy 12 may be disposed on a collapsible frame that collapses inward much like existing pop-up tents. In a four side-beam configuration, stands 26 may not be necessary.

Figure 4:
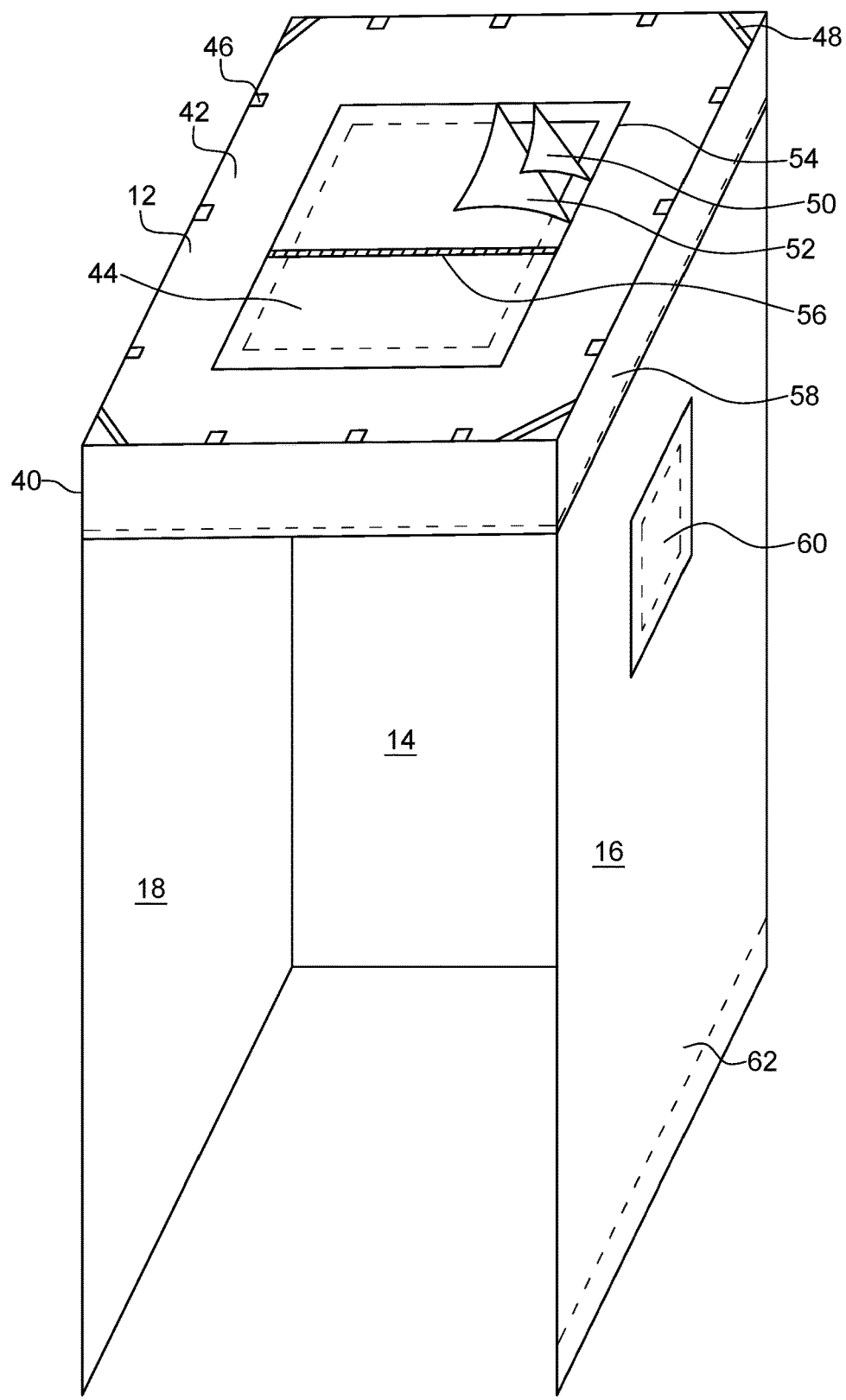
FIG. 4 is a perspective view of a schematic diagram of the canopy and side paneling of the lighting box of FIG. 1 with the frame excluded for clarity.

FIG. 4 shows a schematic diagram of the canopy 12 and paneling of the lighting box 10, with the frame excluded for clarity. Canopy 12 preferably comprises an upper panel 42 capping four side panels 40 that extend downward from the upper panel 42 a set distance (e.g. 6-8 inches). Upper panel 42 comprises a plurality of fastening tabs 46 that may be secured around members the top frame member 22 (see FIG. 1) via hook-and-loop, buttons, or other fastening means (not shown). Corner straps 48 may also be used to secure the canopy 12 at the corners of the frame 22.

The side panels 40 of the canopy 12 comprise a releasable fastener(s) 58 (e.g. mating hook-and-loop material, zipper, buttons, or the like fastener) that releasably fastens the front panel 15 (shown removed in FIG. 4 for clarity), side panels 16/18 and back panel 14 such that they hang downward from the canopy toward the ground. Each of the panels 14, 15, 16, and 18 comprises a loop 62 at their bottom end to allow a weighting member (e.g. heavy rod or like elongate member-not shown) to provide weight to the bottom end. Each of the panels 14, 15, 16, and 18 may be selectively detached or attached according to the desired lighting project. Each of the panels 14, 15, 16, and 18 may also be rolled from the bottom to control the amount of light that enters the box at any one side.

In one embodiment, the canopy 12 and panels comprise a textile fabric (e.g. Ultrabounce, The Rag Place, Inc.) having a white side that provides a soft, even bounce (reflector) without any hot spot, and the reverse matte black side (blocking) that can be used for negative fill or masking. The fabric may also be reversed from the configuration shown in FIG. 1 so that the white side is disposed to be on the inside walls of the box 10.

In a another embodiment, any of the panels 14, 15, 16, and 18 may be replaced with a different material, e.g. duvetyne, bleached muslin, silk, 2-stop net, or other fabric available in the art, depending on the desired lighting configuration.

Canopy 12 may also further comprises a removable window panel 44 that may be partially or wholly removed from the upper panel 42 for various lighting effects. Window panel 44 may comprise a dual layer structure comprising first layer 52 of a first material (e.g. Ultrabounce) and a second layer 50 comprising a different material (e.g. silk for diffused light control of sunlight entering from the top of the box). Each layer is attached with a fastener 54 (e.g. hook-and-loop). A zipper 56 may also span the panel 44 to further control light into the top of the canopy 12.

The side panels 16, 18 may also comprise one or more additional window panels 60, having similar dual-layer construction as top widow panel 44, to control light through the sides of the box. Back panel 14 and associated side panel 40 of the canopy 12 may comprise an adjustable strap with buckle attached to the back left and right corners, along with a fastening strip for holding various rolling backdrops (e.g. 4 ft roll of seamless backdrop material, not shown).

Figure 5:
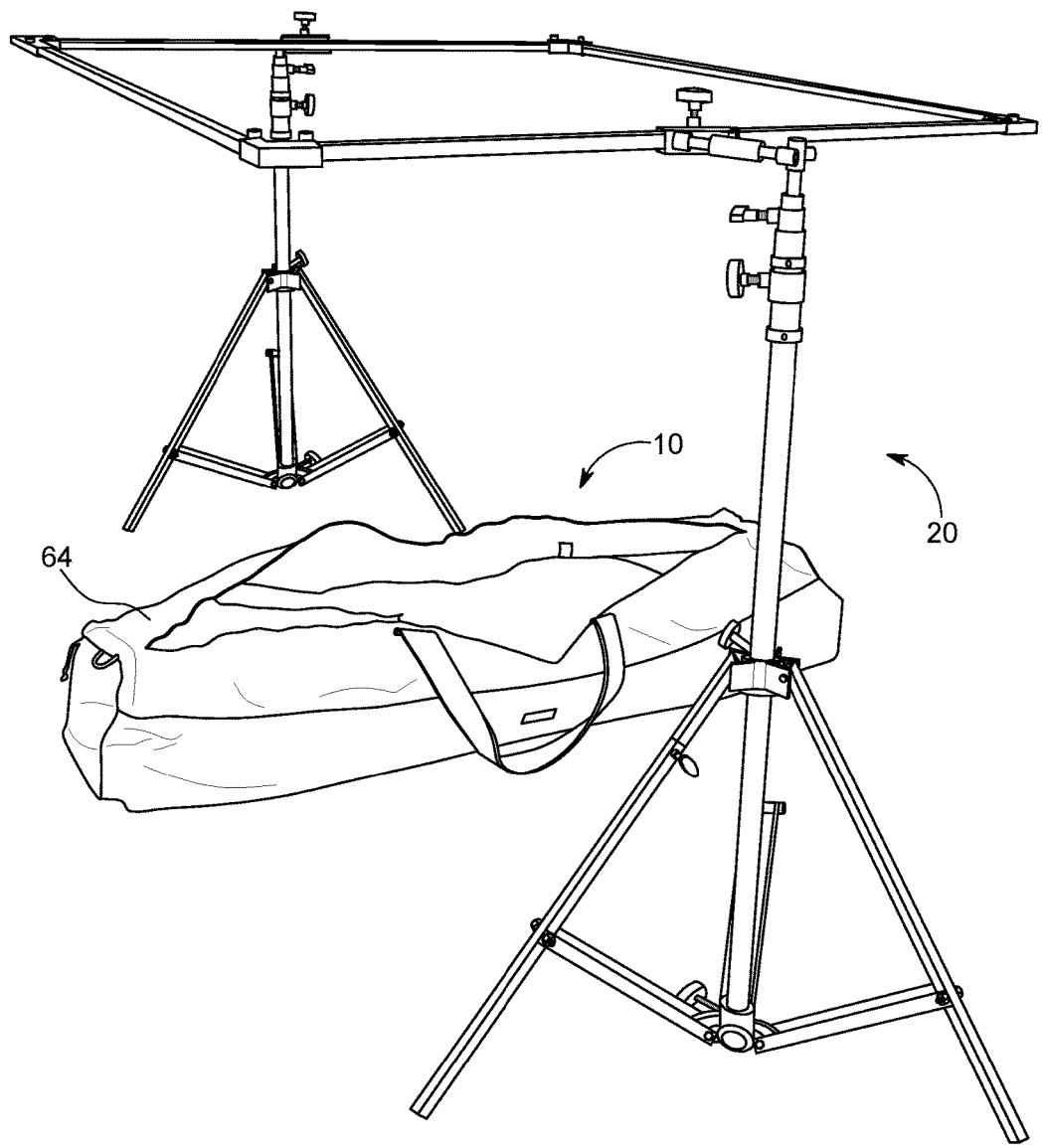
FIG. 5 shows an image of the lighting box with frame assembled and paneling and canopy disposed within carrying case.
Figure 6:
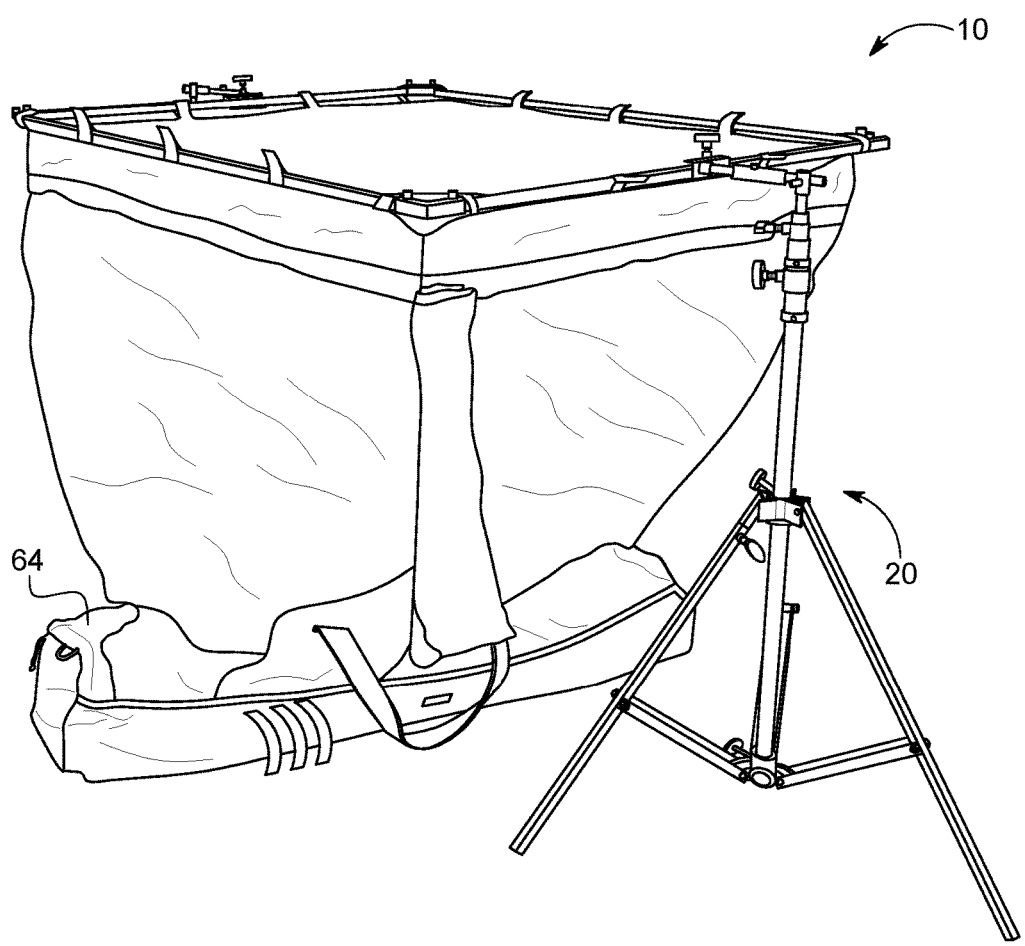
FIG. 6 shows an image of the paneling and canopy installed to the frame.

FIGS. 5 and 6 show images of a typical assembly operation of the lighting box 10. The entire assembly is configured to be broken down to fit in a carrying bag 64. Referring first to FIG. 5, the frame 20 is removed and assembled with stands 26 open and telescoping beams 24 in a lowered configuration. The panels 14, 15, 16, and 18 and canopy 12 are then removed from the carrying bag 64.

FIG. 6 shows an image of the paneling and canopy 12 installed as a unit to the frame 20. First, the fastening tabs 46 and corner straps 48 are secured around members the top frame member 22. The panels 14, 15, 16, and 18 are then attached to the canopy 12 via fastener 58. Finally, the telescoping beams 24 are elevated to the proper height, as shown in FIG. 1. The panels 14, 15, 16, and 18 may be individually removed, partially rolled up, reversed, etc. according to the desired lighting in the box. For example, back panel 18 may comprise a mesh material that allows a specified amount of light to match the light in the box to the light of the background.

From the description herein, it will be appreciated that that the present disclosure encompasses multiple embodiments which include, but are not limited to, the following:

1. A lighting box for photography, comprising: a canopy configured for releasably attaching a one or more fabric panels; and a frame configured to hold the canopy in an elevated position; wherein the frame comprises a releasably collapsible top frame member that has a rectangular shape when in an expanded configuration; the top frame member configured to suspend the canopy in an elevated orientation above the ground such that the one or more fabric panels drape down from the canopy when attached to the canopy to form a rectangular lighting box; the frame further compris- ing a plurality of telescoping beams configured to elevate the top frame member a specified distance from the ground.

2. The method or apparatus of any of the previous or subsequent embodiments, wherein the plurality of telescoping beams comprises a pair of vertically telescoping beams disposed at laterally outward positions to from the rectangular top frame member.

3. The method or apparatus of any of the previous or subsequent embodiments, wherein the panels comprise a front panel, pair of side panels, and rear panel; and wherein each of the one or more fabric panels may be partially or fully detached from the canopy or rolled back according to a form a desired lighting effect within the rectangular lighting box.

4. The method or apparatus of any of the previous or subsequent embodiments, wherein at least one of the one or more fabric panels and canopy comprise a releasably attachable window configured to allow transmission of light at varying levels into the rectangular lighting box.

5. The method or apparatus of any of the previous or subsequent embodiments, wherein the releasably attachable window comprises multiple layers of fabric, each of said multiple layers having varying light transmission characteristics.

6. The method or apparatus of any of the previous or subsequent embodiments, wherein each of the one or more fabric panels are releasably attached to the canopy via a fastener.

7. The method or apparatus of any of the previous or subsequent embodiments, wherein the canopy comprises an upper panel attached to four side panels, the side panels extending downward from the upper panel when the upper panel is secured to the top frame member.

8. The method or apparatus of any of the previous or subsequent embodiments, wherein the one or more fabric panels are each releasably attached to respective side panels of the canopy via the fastener.

9. The method or apparatus of any of the previous or subsequent embodiments, wherein the one or more side panels and canopy comprise a fabric specifically configured to provide a desired transmission, reflectance, or diffusion of light into the rectangular lighting box.

10. A method of modifying lighting on subject to be photographed, the method comprising: elevating a canopy over a shooting region to be occupied by the subject; the canopy being disposed on frame configured to be expanded from a collapsed state; attaching one or more fabric side panels to drape from the canopy; and forming a rectangular lighting box at said shooting region, said lighting box providing a specified lighting configuration from one or more of transmission, reflectance, or diffusion of natural light from the one or more fabric side panels and canopy.

11. The method or apparatus of any of the previous embodiments:

wherein the frame comprises a releasably collapsible top frame member that has a rectangular shape when in an expanded configuration; the top frame member configured to suspend the canopy in an elevated orientation above the ground such that the one or more fabric panels drape down from the canopy when attached to the canopy to form a rectangular lighting box; the frame further comprising a plurality of telescoping beams configured to elevate the top frame member a specified distance from the ground 12. The method or apparatus of any of the previous embodiments, wherein the plurality of telescoping beams comprises a pair of vertically telescoping beams disposed at laterally outward positions to from the rectangular top frame member.

13. The method or apparatus of any of the previous embodiments, wherein the panels comprise a front panel, pair of side panels, and rear panel; and wherein each of the one or more fabric panels may be partially or fully detached from the canopy or rolled back according to a form a desired lighting effect within the rectangular lighting box.

14. The method or apparatus of any of the previous embodiments, wherein at least one of the one or more fabric panels and canopy comprise a releasably attachable window configured to allow transmission of light at varying levels into the rectangular lighting box.

15. The method or apparatus of any of the previous embodiments, wherein the releasably attachable window comprises multiple layers of fabric, each of said multiple layers having varying light transmission characteristics.

16. The method or apparatus of any of the previous embodiments, wherein each of the one or more fabric panels are releasably attached to the canopy via a fastener.

17. The method or apparatus of any of the previous embodiments, wherein the canopy comprises an upper panel attached to four side panels, the side panels extending downward from the upper panel when the upper panel is secured to the top frame member.

18. The method or apparatus of any of the previous embodiments, wherein the one or more fabric panels are each releasably attached to respective side panels of the canopy via the fastener.

19. The method or apparatus of any of the previous embodiments, wherein the one or more side panels and canopy comprise a fabric specifically configured to provide a desired transmission, reflectance, or diffusion of light into the rectangular lighting box.

Although the description above contains many details, these should not be construed as limiting the scope of the description but as merely providing illustrations of some of the presently preferred embodiments of this description. Therefore, it will be appreciated that the scope of the present description fully encompasses other embodiments which may become obvious to those skilled in the art, and that the scope of the present description is accordingly to be limited by nothing other than the appended claims, in which reference to an element in the singular is not intended to mean "one and only one" unless explicitly so stated, but rather "one or more."

In the claims, reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present description, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A lighting box for photography, comprising:
   a canopy configured for releasably attaching a one or more fabric panels; and
   a frame configured to hold the canopy in an elevated position;
   wherein the frame comprises a releasably collapsible top frame member that has a rectangular shape when in an expanded configuration;
   the top frame member configured to suspend the canopy in an elevated orientation above the ground such that the one or more fabric panels drape down from the canopy when attached to the canopy to form a rectangular lighting box;
   the frame further comprising a plurality of telescoping beams configured to elevate the top frame member a specified distance from the ground.

2. The lighting box of claim 1, wherein the plurality of telescoping beams comprises a pair of vertically telescoping beams disposed at laterally outward positions to from the rectangular top frame member.

3. The lighting box of claim 1, wherein the panels comprise a front panel, pair of side panels, and rear panel; and
   wherein each of the one or more fabric panels may be partially or fully detached from the canopy or rolled back according to a form a desired lighting effect within the rectangular lighting box.

4. The lighting box of claim 1, wherein at least one of the one or more fabric panels and canopy comprise a releasably attachable window configured to allow transmission of light at varying levels into the rectangular lighting box.

5. The lighting box of claim 4, wherein the releasably attachable window comprises multiple layers of fabric, each of said multiple layers having varying light transmission characteristics.

6. The lighting box of claim 1, wherein each of the one or more fabric panels are releasably attached to the canopy via a fastener.

7. The lighting box of claim 6, wherein the canopy comprises an upper panel attached to four side panels, the side panels extending downward from the upper panel when the upper panel is secured to the top frame member.

8. The lighting box of claim 7, wherein the one or more fabric panels are each releasably attached to respective side panels of the canopy via the fastener.

9. The lighting box of claim 1, wherein the one or more side panels and canopy comprise a fabric specifically configured to provide a desired transmission, reflectance, or diffusion of light into the rectangular lighting box.

10. A method of modifying lighting on subject to be photographed, the method comprising:
    elevating a canopy over a shooting region to be occupied by the subject;
    the canopy being disposed on frame configured to be expanded from a collapsed state;
    attaching one or more fabric side panels to drape from the canopy; and
    forming a rectangular lighting box at said shooting region, said lighting box providing a specified lighting configuration from one or more of transmission, reflectance, or diffusion of natural light from the one or more fabric side panels and canopy.

11. The method of claim 10:
    wherein the frame comprises a releasably collapsible top frame member that has a rectangular shape when in an expanded configuration;
    the top frame member configured to suspend the canopy in an elevated orientation above the ground such that the one or more fabric panels drape down from the canopy when attached to the canopy to form a rectangular lighting box;

the frame further comprising a plurality of telescoping beams configured to elevate the top frame member a specified distance from the ground.

12. The method of claim 10, wherein the plurality of telescoping beams comprises a pair of vertically telescoping beams disposed at laterally outward positions to from the rectangular top frame member.

13. The method of claim 10, wherein the panels comprise a front panel, pair of side panels, and rear panel; and wherein each of the one or more fabric panels may be partially or fully detached from the canopy or rolled back according to a form a desired lighting effect within the rectangular lighting box.

14. The method of claim 10, wherein at least one of the one or more fabric panels and canopy comprise a releasably attachable window configured to allow transmission of light at varying levels into the rectangular lighting box.

15. The method of claim 14, wherein the releasably attachable window comprises multiple layers of fabric, each of said multiple layers having varying light transmission characteristics.

16. The method of claim 10, wherein each of the one or more fabric panels are releasably attached to the canopy via a fastener.

17. The method of claim 16, wherein the canopy comprises an upper panel attached to four side panels, the side panels extending downward from the upper panel when the upper panel is secured to the top frame member.

18. The method of claim 17, wherein the one or more fabric panels are each releasably attached to respective side panels of the canopy via the fastener.

19. The method of claim 10, wherein the one or more side panels and canopy comprise a fabric specifically configured to provide a desired transmission, reflectance, or diffusion of light into the rectangular lighting box.

* * * * *